United States Patent [19]
Katz

[11] 3,943,659
[45] Mar. 16, 1976

[54] FILTRATION AND CIRCULATION SYSTEM AND APPARATUS THEREFORE

[76] Inventor: Louis N. Katz, 13415 Land O'Woods Drive, St. Louis, Mo. 63141

[22] Filed: July 10, 1974

[21] Appl. No.: 487,222

Related U.S. Application Data

[62] Division of Ser. No. 380,228, July 18, 1973, Pat. No. 3,835,813.

[52] U.S. Cl. .................................................. 47/1.4
[51] Int. Cl.² .......................................... A01G 7/00
[58] Field of Search .............. 119/2, 3, 4, 5; 47/1.4, 47/41.13

[56] References Cited
UNITED STATES PATENTS

| | | |
|---|---|---|
| 3,598,726 | 8/1971 | Welch .................................. 47/1.4 |
| 3,683,177 | 8/1972 | Veloz ..................................... 119/5 |
| 3,698,132 | 10/1972 | Green et al. ....................... 47/41.13 |

*Primary Examiner*—Hugh R. Chamblee

[57] ABSTRACT

A balanced system for purifying aquatic media and maintaining aquatic specimens which comprises biological filtration, mechanical filtration and algae propagation.

10 Claims, 4 Drawing Figures

FILTRATION AND CIRCULATION SYSTEM AND APPARATUS THEREFORE

This is a division of application Ser. No. 380,228, filed July 18, 1973, now U.S. Pat. No. 3,835,813.

BACKGROUND OF THE INVENTION

Many attempts have been made to provide filtration systems for the purification and maintenance of suitable aquaria environments, whether of a salt water or fresh water nature. Since an aquarium contains a fixed volume of water, which is used over and over again, its ecology is fragile and dependent upon many interrelated biological vectors.

An aquarium will not function in a proper manner (i.e., it will not present aquarium specimens with a healthful living environment) without a balanced interplay of certain biological and biochemical systems:

a. Oxygen-Carbon Dioxide Cycle: These gases are fundamental in the sustenance of plant and animal life. Plants absorb carbon dioxide which is necessary for photosynthesis and release oxygen for use in animal respiration which also releases carbon dioxide for plant use. It is therefore important, in an aquarium, that there is provided means whereby there is an oxygen/carbon dioxide exchange for the sustenance of said specimens.

b. Nitrogen Cycle: The excreta of aquatic specimens is principally in the form of insoluble organic and inorganic waste matter and urea. The urea is converted to soluble ammonium salts and carbon dioxide in water. Nitrifying bacteria, i.e. nitrococci and nitrate forming bacteria, combined with chemical reaction, oxidize the ammonia to nitrites (which are toxic to aquatic specimens) and then bacterial action oxidizes the nitrites to nitrates which are utilized by plant life and which, in turn, are used as a food source by the aquatic specimens.

c. Particulate Matter: The insoluble organic and inorganic waste materials, which are excreted by aquatic specimens and which also are formed by the natural decomposition of plant and animal tissues, must be removed from the aquarium environment. Soluble particulate matter is converted by bacterial action to plant and animal foods but the concentration of such material in a fixed volume of water, such as an aquarium, must be kept carefully balanced so that the system does not become overloaded.

Although the use of proper aquatic plants combined with natural bacterial action and proper mechanical filtration can provide a relatively balanced system with proper maintenance, the problem of maintaining a proper environment for aquatic specimens in the absence of plant materials has recently become more important. This problem is important to those professionals and hobbyists who do not or cannot provide the time necessary to adequately maintain a flourishing plant colony within the aquarium and it has become especially important for those professionals and hobbyists who prefer to maintain marine specimens. The maintenance of a proper plant colony in a salt water aquarium is much greater than that required to maintain a plant colony in a fresh water aquarium. Further, it is preferred, many times, to exclude plant material from the aquarium, even those aquariums utilizing fresh water, since it is difficult to keep the aquarium clean due to the decomposition of plant material. Resort must be had to vacuum cleaning of the aquarium and periodically replacing the aquarium water in order to prevent the water from becoming overloaded with decomposing plant material to the detriment of marine or fresh water specimens. The use of particulate filters, such as are known and which utilize carbon and/or fibrous materials, does not provide sufficient filtration action to provide a healthful environment for aquatic specimens.

PRIOR ART

The prior art references which are considered pertinent to the present invention are summarized below.

U.S. Pat. No. 3,314,396 discloses a device, which may be composed of glass mesh or a plastic material, for use in an aquarium for the propagation of algae as a nutrient medium for fresh water fish.

U.S. Pat. No. 3,387,587 discloses a "biochemical" filter which serves to control the alkalinity of aquarium water and to provide a porous surface conducive to the growth of nitrifying bacteria.

U.S. Pat. No. 3,557,753 discloses a 3-component filter system comprising (a) a "living" filter of algae and plants, (b) a calcite filter and (c) a biological filter.

U.S. Pat. No. 3,661,262 discloses a filtration system comprising (a) a particulate filter, (b) a biological filter and (c) a charcoal or resin filter.

U.S. Pat. No. 3,693,798 discloses the treatment of aquarium water whereby an external filter and a bottom structure, designed to support a layer of gravel, is utilized. The water flow is directed to the bottom of the aquarium tank and forced upward through the sand layer. Primary filtration occurs in the external filter and aerobic action takes place in the main body of the aquarium.

It is apparent from the above prior art references, that filtration systems comprising biological and particulate filters are well known. Further, it is known to include a "living" filter composed of algae and plants in such systems. In such systems, however, algae establish themselves throughout the aquarium tank, i.e. on its sides and within the sand covering the bottom of the aquarium, and eventually impede the function of associated particulate and/or biological filters. Further, present methods of providing for the growth of algae are not controllable to any extent and do not provide for sufficient algae growth to support life, especially in marine tanks containing no other forms of plant life. Additionally, prior art devices relating to algae growth are either too cumbersome for practical use because of the large surface areas necessary for algae growth or are too small to grow sufficient algae for practical use in an aquarium.

SUMMARY OF THE INVENTION

In order to provide a balanced system for purifying and maintaining an aquarium environment, particularly in the absence of plant life, the present invention provides a filtration and maintenance system comprising (a) biological filter means, (b) mechanical or particulate matter filtration means and (c) unique algae propagation means. Use of the purification and maintenance system, which will be hereinafter more fully described in detail, affords a means of establishing and maintaining a balanced aquarium system for fresh water and marine specimens which dispenses with the need for plant life. Plant life, of course, is expensive to obtain and difficult to maintain, especially in a marine system. There is thus provided, by the present invention, an improvement over the prior art in that a balanced aquarium system is attained through the combined effects of filtering means and algae propagation means.

DESCRIPTION OF THE DRWINGS

The means by which the purpose of the present invention is accomplished will become apparent by reference to the accompanying drawings which form a part of this specification and which illustrate certain preferred embodiments of this invention and the best mode contemplated for practicing same. In the drawings, like characters of reference refer to like parts.

DESCRIPTION OF THE PREFERRED EMBODIMENTS

A. General Construction

Figure 1:
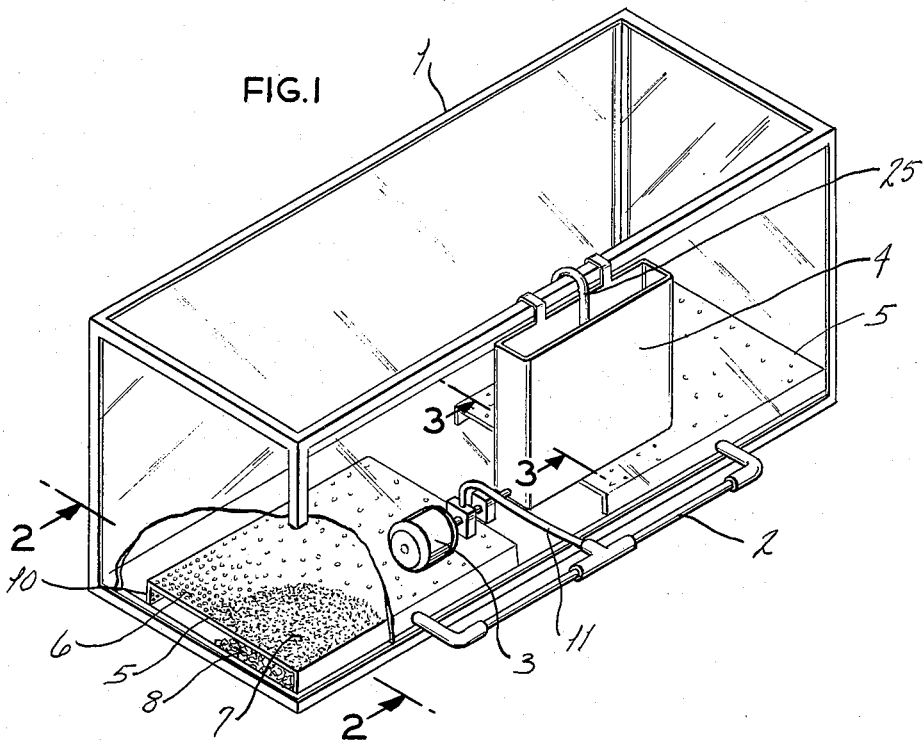
FIG. 1 is a view of an aquarium tank provided with biological and mechanical filtration means and algae propagation means persuant to the present invention.

Briefly described, the present invention contemplates, with reference to FIG. 1, an aquarium tank 1 equipped with water circulation tubing 2 and a pump 3 for the circulation of water through the tank and its associated apparatus. Attached to the rear of the tank 1 is a filtration and propagation unit 4 which contains particulate filtration means and an algae propagation chamber. Within the tank 1, and resting on the bottom thereof, is supplemental biological filtration means 5.

B. Filtration Systems

Figure 2:
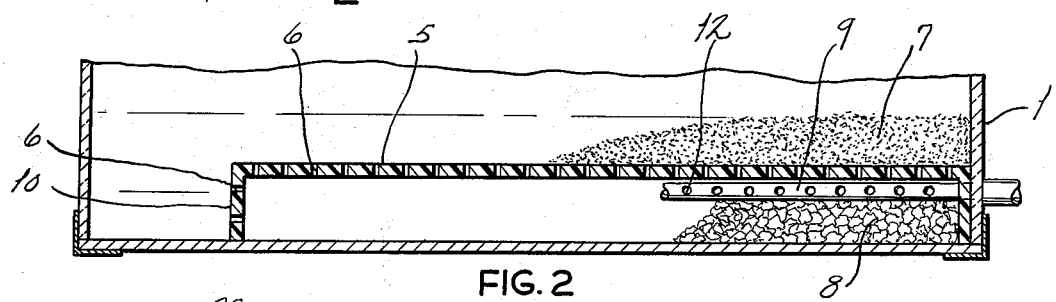
FIG. 2 is a partial sectional view taken on line 2—2 of FIG. 1.

The present invention is directed to the use of two filtration systems combined with algae propagation means to provide a balanced environment within the tank 1 which may be of glass, plastic, e.g. acrylic or similar transparent material. With particular reference to FIG. 2, there is provided biological filter means 5, constructed preferably of plastic, having perforations 6 to allow for the circulation of water through the filter into the main body of the tank. The biological filter 5 rests in spaced relationship to the bottom of the tank 1 on support members 10 and is covered by an aggregate material 7 such as sand or the like. An innovation of the present invention is the use of a supplemental aggregate material 8 underneath the filter 5, such aggregate being of larger particle size than the aggregate which rests upon the filter and within which the filter is buried. It has been discovered that inclusion of a porous aggregate material such as charcoal, crushed shell, small stones, marble chips, dolomite and the like beneath the filter 5 allows for enhanced bacterial growth and more rapid and complete oxidation of waste materials by the bacteria. A water circulation tube 9 connected to the pump 3 via tube 11 is positioned beneath the filter 5 and surrounded by the aggregate 8. The portion of the water circulation tube 9 within the tank is perforated 12 to allow maximum circulation of water within the aggregate 8 to afford maximum benefits.

Figure 3:
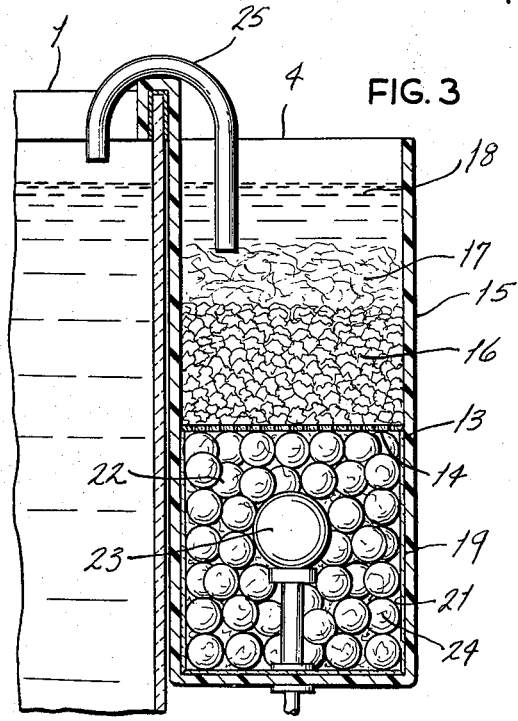
FIG. 3 is an enlarged detail sectional view taken on line 3—3 of FIG. 1.

With reference to FIG. 3, there is indicated combined unit 13 which houses two chambers separated by a perforated partition 14 composed of plastic, metal or glass. The upper, filtration chamber 15 contains granular black carbon or other similar purification material 16 covered with resin fiber, spun glass wool or the like 17. The purpose of the filtration chamber 15 is to remove particulate matter, which is not trapped in the biological filter 5, from the circulating water 18 and to deodorize it.

C. Propagation System

The lower chamber 19 affords the basic innovative concept of the invention. The chamber is lined with mirrors 21, but the degree to which the chamber is lined with mirrors is optional. Thus at least two sides of the chamber should be mirrored-lined. Additionally, the bottom and all four sides may be so-lined. Further, the perforated partition separating the upper and lower chambers of the combined unit 15 may be mirrored on its lower side. The lower chamber 19 is filled with clear glass spheres, e.g. glass marbles 22, surrounding a centrally located light source 23. The purpose of the lower chamber 19 is to provide an environment for the propagation of algae 24 which are necessary for the maintenance of aquarium specimens, especially marine specimens which are raised in the absence of normal plant life.

Figure 4:
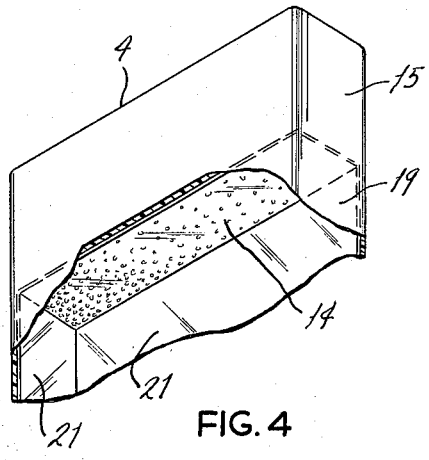
FIG. 4 is a fragmentary sectional view of a portion of FIG. 3.

FIG. 4 shows further detail of the lower chamber 19, i.e. the algae chamber, of combined unit 15 illustrating the inside mirrored surfaces 21 thereof.

D. General Operation

The tank 1 receives aqueous media via inlet tubes 2 and it is distributed throughout the tank. The aqueous media enters through inlet pipe 9 and passes through the biological filter means 5 wherein bacteria act on dissolved and suspended excreta from the aquarium specimens, converting the excreta to nitrates which are used as nutritional source by the algae 24 in the propagation chamber 19. Additionally, a certain amount of solid waste is trapped within the biological filter 5. The aqueous media flows upwardly through the perforations 6 in the biological filter 5, through the aggregate 7, e.g. sand, covering it, to circulate throughout the main body of the tank 1. By virtue of the partial vacuum created in the inlet tubes 2 and outlet tube 25 by pump 3, which may be magnetic, the aqueous media exits the tank 1 via outlet tube 25 and enters combined unit 15 where it traverses the top layer of particulate filter media 17, e.g. spun glass fibers, cotton, etc. and the lower layer 16, e.g. charcoal, carbon black, resin or the like and continues to flow downwardly through the perforated partition 14 to the algae propagation chamber 19 which is lined with mirrored surfaces 21, completely filled with clear glass spheres 22 and illuminated by a centrally located light source 23. The glass spheres within the algae propagation chamber serve a dual purpose: the surface area provided by the spheres 22 provides a much greater growing area for the algae 24 than has heretofore been available and the clear material, e.g. glass, plastic, of which the spheres are composed allows for conduction of light throughout all areas of the chamber. The glass spheres should generally have a minimum diameter of approximately ¼ inch. In general, the maximum size of the transparent spheres is dependent on the size of the contemplated aquarium, the number and type of fish, etc. Extremely large spheres are impractical while smaller spheres tend to become too tightly compacted for good algae growth and would restrict circulation. Further, the mirrored walls, top and bottom of the chamber 19 provide for further reflectance of light throughout the chamber. By virtue of the special and innovative construction of the algae propagation chamber in combination with the described filters, applicant is able to provide algae growth and aqueous media purification sufficient to support 2 to 3 times the normal density of aquatic specimens for a given area. The algae in the propagation chamber serve to convert nitrates to vegetable protein which is then circulated throughout the tank 1 and utilized as a nutritional source for the aquatic specimens. Additionally, 2nd and 3rd generation algae are continually sloughed from the spheres and are circulated for additional nutritional value. The amount of algae grown can be regulated by the amount and intensity of light transmission within the propagation chamber 19 as well as by the amount of mirrored surfaces presented and the volume of spheres utilized. It has been discovered, in accordance with this invention, that the amount and direction of the light within the propagation chamber is important for the uniform, controlled growth of algae. To this end, all mirrored surfaces must be parallel to the light source and the various factors regulating algae growth should be controlled so as to afford a 5–6 millimeter thickness of algae on the glass spheres. Thicker growth of algae will tend to reduce the transmission of light throughout the filter.

Due to the efficient algae propagation chamber of the invention, the aquatic specimens are maintained in excellent health for the reasons heretofore described and because of the newly discovered absorption of trace elements, normally lost, by the algae and ingestion of the algae by the aquatic specimens. It has further been recently discovered that the most efficient algae are those which require a substrate, rather than free-floating algae.

Accordingly, upon passing through the algae propagation chamber, the circulating aqueous media provides nutrition for the algae in the form of soluble excreta, and carries a certain amount of above. into the tank for nutrition of aquatic specimens.

With regard to water circulation through the system, it should be understood that, with minor tubing modifications, the circulation of aqueous media may be reversed from the flow discussed a ove.

The combined unit 15 is preferably composed of a dark material, such as black plastic and the like in order to prevent outside light from entering the algae chamber 19. In this manner, the light within chamber 19 is precisely controlled. The light source 23 for chamber 19 is preferably incandescent although fluorescent light is suitable.

As a practical illustration of the benefits afforded by the invention, a 65 gallon marine tank was equipped with the filtration and propagation system of the invention. The tank functioned for nearly 3 years without disruption. The pH was naturally stable and nitrite readings were consistently below 1 ppm. The population consisted of 46 inches of fish and 6 heads of live coral. The water returned to the tank from the algae propagation chamber was polished and nitrite-free.

While the invention has been described by referring to certain specific embodiments, it is not so limited since many modifications are possible in the light of the above teachings. The invention may therefore be practiced otherwise than as specifically described without departing from the spirit and scope thereof.

The embodiments of the invention in which an exclusive property or privelege is claimed are defined as follows:

1. An algae propagation chamber comprising a housing filled with transparent spheres surrounding a centrally located light source and means for entry and exit of aqueous media.

2. Chamber of claim 1 wherein said housing is composed of plastic.

3. Chamber of claim 2 wherein said plastic is black plastic.

4. Chamber of claim 1 wherein said chamber is lined, on at least two surfaces thereof, with mirrors.

5. Chamber of claim 4 wherein said mirrors are parallel to said light source.

6. Chamber of claim 1 wherein said spheres are glass spheres.

7. Chamber of claim 1 wherein said spheres are plastic spheres.

8. Chamber of claim 1 wherein said spheres have a diameter of at least approximately ¼ inch.

9. Chamber of claim 1 wherein said light source is an incandescent light source.

10. Chamber of claim 1 wherein said light source is a fluorescent light source.

* * * * *